US010717075B2

(12) United States Patent
Ferguson et al.

(10) Patent No.: US 10,717,075 B2
(45) Date of Patent: Jul. 21, 2020

(54) FISCHER-TROPSCH PROCESS USING REDUCED COBALT CATALYST

(71) Applicant: BP P.L.C., London (GB)

(72) Inventors: Ewen Ferguson, Saltend (GB); Piotr Krawiec, Middlesex (GB); Manuel Ojeda Pineda, Yorkshire (GB); Alexander Paterson, Yorkshire (GB); Matthew James Wells, Yorkshire (GB)

(73) Assignee: BP P.L.C., London (GB)

( * ) Notice: Subject to any disclaimer, the term of this patent is extended or adjusted under 35 U.S.C. 154(b) by 0 days.

(21) Appl. No.: 15/533,554

(22) PCT Filed: Dec. 2, 2015

(86) PCT No.: PCT/EP2015/078417

§ 371 (c)(1),
(2) Date: Jun. 6, 2017

(87) PCT Pub. No.: WO2016/091693

PCT Pub. Date: Jun. 16, 2016

(65) Prior Publication Data

US 2017/0368546 A1 Dec. 28, 2017

(30) Foreign Application Priority Data

Dec. 12, 2014 (EP) .................................... 14197770

(51) Int. Cl.

| | |
|---|---|
| ***C10G 2/00*** | (2006.01) |
| ***B01J 37/18*** | (2006.01) |
| ***B01J 21/06*** | (2006.01) |
| ***B01J 23/75*** | (2006.01) |
| ***B01J 37/02*** | (2006.01) |
| ***B01J 37/00*** | (2006.01) |

(52) U.S. Cl.

CPC ............ *B01J 37/18* (2013.01); *B01J 21/063* (2013.01); *B01J 23/75* (2013.01); *B01J 37/0009* (2013.01); *B01J 37/0201* (2013.01); *C10G 2/332* (2013.01)

(58) Field of Classification Search

None

See application file for complete search history.

(56) References Cited

U.S. PATENT DOCUMENTS

| | | | |
|---|---|---|---|
| 4,738,948 A | 4/1988 | Iglesia et al. | |
| 5,168,091 A | 12/1992 | Behrmann et al. | |
| 5,258,411 A | 11/1993 | Behrmann et al. | |
| 6,486,220 B1 * | 11/2002 | Wright ................ | B01J 23/8896 502/20 |
| 7,851,404 B2 | 12/2010 | Lok | |
| 2010/0160146 A1 * | 6/2010 | Bezemer ................. | B01J 23/75 502/26 |
| 2011/0054048 A1 | 3/2011 | Lok | |
| 2016/0175821 A1 * | 6/2016 | Van Bavel ............. | B01J 27/138 518/715 |

FOREIGN PATENT DOCUMENTS

| | | |
|---|---|---|
| CN | 102863306 A | 1/2013 |
| WO | WO 97/17137 A1 | 5/1997 |
| WO | 98/11037 A1 | 3/1998 |

OTHER PUBLICATIONS

Li (Li, J. et al. "Fischer-Tropsch synthesis: effect of small amounts of boron, ruthenium and rhenium on Co/TiO2 catalysts" Applied Catalysis A: General 223 (2002) 195-203) (Year: 2002).*

Johnson et al., "The role of surface structure and dispersion in CO hydrogenation on cobalt," Journal of Catalysis 128 (1):231-247 (1991).

* cited by examiner

*Primary Examiner* — Medhanit W Bahta

(74) *Attorney, Agent, or Firm* — McDonnell Boehnen Hulbert & Berghoff LLP

(57) ABSTRACT

A process for the conversion of a feed comprising a mixture of hydrogen and carbon monoxide to hydrocarbons, the hydrogen and carbon monoxide in the feed being present in a ratio of from 1:9 to 9:1 by volume, the process comprising the step of contacting the feed at elevated temperatures and atmospheric or elevated pressure with a catalyst comprising titanium dioxide and cobalt wherein the catalyst initially comprises from 30% to 95% metallic cobalt by weight of cobalt.

14 Claims, No Drawings

FISCHER-TROPSCH PROCESS USING REDUCED COBALT CATALYST

This application is the U.S. national phase of International Application No. PCT/EP2015/078417 filed Dec. 2, 2015 which designated the U.S. and claims priority to European Patent Application No. 14197770.2 filed Dec. 12, 2014, the entire contents of each of which are hereby incorporated by reference.

This invention relates to Fischer-Tropsch (FT) processes for the conversion of a feed comprising a mixture of carbon monoxide gas and hydrogen gas (e.g. synthesis gas (syngas)) to hydrocarbons over a cobalt catalyst comprising a titanium dioxide (titania) support, catalysts therefor and uses of said catalysts.

Known FT processes typically utilise a stable catalyst composition comprising oxidic cobalt, such as cobalt(II) dicobalt(III) oxide (also known as cobalt oxide or cobalt(II, III) oxide, i.e. $Co_3O_4$) which may be supported on titanium dioxide, and employ a reduction step in order to activate the catalyst by reducing the cobalt(II,III) oxide to elemental (or metallic) cobalt ($Co^0$) which is understood to be the catalytically active species. It has thus been thought desirable to reduce as much of the cobalt present as possible in order to improve the activity of the resultant catalyst, in other words to obtain a degree of reduction of the cobalt as near to 100% as possible. See Batholomew et al, Journal of Catalysis 128, 231-247 (1991). U.S. Pat. No. 7,851,404 discloses an FT process utilising a reduced cobalt catalyst comprising a titanium dioxide support. There remains an ongoing need to improve or maintain the properties of such FT catalysts, most notably in relation to their activity, i.e. enabling greater conversion of syngas to hydrocarbons for the same temperature (or equal conversion at lower temperatures) and enabling more desirable selectivity, such as selectivity towards producing hydrocarbons having at least 5 carbon atoms ($C_{5+}$), or selectivity away from producing methane, especially when operating with less energy intensive conditions (i.e. lower temperature or lower duration). Surprisingly, it has now been found that a limited degree (or extent) of reduction of a titanium dioxide supported cobalt catalyst, i.e. reduction achieved to a lower level, (commensurately the degree of reduction of the catalyst when it is subsequently exposed to the feed), may be utilised while still achieving at least acceptable, and even enhanced, catalyst activity and $C_{5+}$ selectivity in an FT process.

According to a first aspect, the present invention thus relates to a process for the conversion of a feed comprising a mixture of hydrogen and carbon monoxide to hydrocarbons, the hydrogen and carbon monoxide in the feed being present in a ratio of from 1:9 to 9:1 by volume, the process comprising the step of contacting the feed at elevated temperature and atmospheric or elevated pressure with a catalyst comprising titanium dioxide and cobalt wherein the catalyst initially comprises from 30% to 95% metallic cobalt by weight of cobalt. This aspect may also desirably include a step of pre-treating a catalyst composition comprising titanium dioxide support and oxidic cobalt (e.g. cobalt oxide) or a cobalt compound decomposable thereto by reduction to produce the catalyst above.

Advantageously in the process of the present invention, the catalyst initially comprises from 35% to 90% metallic cobalt by weight of cobalt, preferably from 40% to 85% (or 50% to 85%) metallic cobalt by weight of cobalt, such as from 70% to 80% metallic cobalt by weight of cobalt. As used herein, the general term "cobalt" includes cobalt either in metallic (elemental) form or as part of a cobalt compound (i.e. referring to the total cobalt present), so for example where the catalyst is referred to as "comprising cobalt", it is intended to mean that the catalyst comprises metallic/elemental cobalt and/or at least one cobalt compound. Commensurately, the mass of cobalt includes the total mass of cobalt atoms and ions present, i.e. ignoring any other ions in any cobalt compounds. As used herein, the more specific terms "metallic cobalt" or "elemental cobalt" mean cobalt in an oxidation state of zero, i.e. $Co^0$.

The percentage metallic cobalt by weight of cobalt (herein interchangeable with the degree of reduction) of the catalyst according to the present invention applies to the catalyst initially, which refers to process startup, i.e. the point in time at which the catalyst is first contacted with the feed. Accordingly, the percentage metallic cobalt by weight of cobalt applies to the catalyst immediately prior to, and/or substantially at the time of, introducing the feed to the catalyst to produce hydrocarbons, or may additionally or alternatively refer to the degree of reduction achieved by a reduction step, especially if such a reduction step is carried out in situ. Notably, it is thus recognised that exposing the catalyst to the feed itself at elevated temperature may further impact the degree of reduction, for example to a level outside the claimed range, such as complete reduction. However, even if further reduction of the catalyst occurs upon, or following exposure to the feed, it has been found that the benefits of the present invention remain, and this is specifically included within the scope of the present invention.

The catalyst employed in the present invention may be obtained by pre-treating a catalyst composition comprising titanium dioxide support and oxidic cobalt or a cobalt compound decomposable thereto, with a reducing agent. Accordingly, a pre-treatment, or reduction step, may be used to obtain the degree of reduction, i.e. by reducing the catalyst. That pre-treatment is not particularly limited by the present invention.

Suitably, a pre-treatment step which may be a gaseous reduction, i.e. using a reducing gas stream, may be employed. If a reducing gas stream is used, it advantageously comprises at least 25 vol. % of a reducing gas, preferably at least 50 vol. % of a reducing gas, more preferably at least 75 vol. % reducing gas, even more preferably at least 90 vol. % reducing gas, even more preferably still at least 95 vol. % reducing gas and yet further preferably is substantially entirely made up of reducing gas. Any remainder may comprise, or be, inert diluents such as argon, helium, nitrogen and/or water vapour, or minor components such as hydrocarbons (e.g. methane) or carbon dioxide. The reducing gas referred to above may particularly be carbon monoxide or hydrogen.

Advantageously, as such gases are readily available where processes using a feed comprising a mixture of hydrogen gas and carbon monoxide gas are located, the catalyst may be pre-treated using reducing gases such as a gas comprising molecular hydrogen (hydrogen gas) and/or a gas comprising carbon monoxide (carbon monoxide gas). If hydrogen gas is used then it is suitable that the reducing gas stream comprises less than 10% carbon monoxide gas (by volume of hydrogen gas and carbon monoxide gas) in order to prevent premature reaction start-up and a resultant poorly performing catalyst. Similarly, if carbon monoxide gas is used then it is suitable that the reducing gas stream comprises less than 10% hydrogen gas (by volume of hydrogen gas and carbon monoxide gas). For the avoidance of any doubt, the upper limit of hydrogen which may be present in the reducing gas stream as reported herein is relative only to the volume of carbon monoxide in the gaseous stream, and not relative to the combined volume of carbon monoxide and any inert diluents or other components. Correspondingly, the upper limit of carbon monoxide which may be present in the reducing gas as reported herein is relative only to the volume of molecular hydrogen in the gaseous stream, and not relative to the combined volume of hydrogen and any inert diluents or other components.

Suitably, the pre-treating step may be performed at a temperature of from 100° C. to 500° C., preferably from 200° C. to 350° C., and/or at any desired pressure, for instance from 10 to 5500 kPa, preferably from 20 to 3000 kPa, more preferably from 50 to 1000 kPa, and even more preferably from 100 to 800 kPa. During this step, reducing gas (such as hydrogen gas or carbon monoxide gas) is suitably passed over the catalyst bed at a gas hourly space velocity (GHSV) in the range from 100 to 10000 $h^{-1}$, preferably from 250 to 5000 $h^{-1}$, such as from 250 to 3000 $h^{-1}$ and more preferably from 250 to 2000 $h^{-1}$, for example 1000 $h^{-1}$. As used herein, unless otherwise specified, GHSV means gas hourly space velocity on gas volumes converted to standard temperature and pressure based on the catalyst bed volume.

In order to efficiently obtain the desired level of metallic cobalt in the catalyst, the pre-treating step of reducing a catalyst advantageously occurs at a temperature of from 200° C. to 300° C., preferably from 220° C. to 280° C., more preferably from 230° C. to 250° C. These temperature ranges particularly apply (non-exclusively) in combination with using carbon monoxide gas and/or hydrogen gas to reduce the catalyst. Within these temperature ranges, it is thought to be easier to control the degree of reduction. As used herein, temperatures may refer to feed temperatures, applied temperatures and/or catalyst bed temperatures.

The precise duration of the pre-treatment step is important only insofar as to obtain the desired degree of reduction. Exemplary durations of the pre-treatment step, which may be in combination with any of the temperature ranges specified above, include from 0.1 to 100 hours, preferably from 1 to 50 hours, more preferably from 5 to 35 hours, even more preferably from 7 to 20 hours, and even more preferably still from 10 to 15 hours.

For convenience, the pre-treatment step may desirably occur in the same reactor used for the subsequent conversion of syngas to hydrocarbons ("in situ") in order to reduce the time and effort required loading and unloading catalysts. Reducing in situ also mitigates the need for any steps to ensure the degree of reduction achieved during the pre-treatment step remains present when the conversion of syngas to hydrocarbons is commenced. The pre-treatment step may, however, also be carried out in another location apart from the FT reactor ("ex situ").

As used herein, the degree of reduction may be measured using temperature programmed reduction (TPR). TPR is a technique for the characterisation of solid materials in which a catalyst (e.g. cobalt(II,III) oxide) is subjected to a programmed temperature increase while a reducing gas is passed over the sample. The effluent gas may be analysed by a thermal conductivity detector (TCD) or mass spectrometer (MS) to determine the decrease in reductant gas concentration or evolution of other species, such as water.

In order to determine the degree of reduction herein, a standard data set is produced by drying a sample and conducting TPR through to 100% reduction of the cobalt atoms present in the catalyst (e.g. corresponding to 100% reduction of $Co_3O_4$ to $Co^0$). The standard data may thus be obtained in situ (i.e. within the TPR unit) by initially exposing the sample to a drying step including contacting the sample with argon gas at a GHSV of 1800 $h^{-1}$, ramping the temperature from 20° C. to 120° C. at a rate of 5° C./min then dwelling at 120° C. for 15 min before cooling back to 20° C. also under argon gas. The TPR itself may be performed utilising 4% $H_2$ gas (in Argon), at a gas hourly space velocity (GHSV) of 3800 $h^{-1}$ and ramping the temperature from 20° C. to 800° C. at a rate of 5° C./min. Sample data is generally produced by conducting the drying step as above, followed by the reduction step desired (for example 10 hours under 100% hydrogen gas at 240, 260, 280 or 300° C. at a GHSV of 1800 $h^{-1}$) and then conducting TPR through to 100% reduction. The sample data may thus be obtained in situ (i.e. within the TPR unit) by initially exposing the sample to a drying step including contacting the sample with argon gas at a GHSV of 1800 $h^{-1}$, ramping the temperature from 20° C. to 120° C. at a rate of 5° C./min then dwelling at 120° C. for 15 min before cooling back to 20° C. also under argon gas. For the reduction step itself, 100% $H_2$ gas may be utilised, also at a GHSV of 1800 $h^{-1}$ and the temperature ramped from 20° C. to 150° C. at a rate of 2° C./min followed by slower ramping from 150° C. to the desired reduction temperature at a rate of 1° C./min before dwelling at the desired reduction temperature for 10 hours and cooling to 20° C. under argon gas. The TPR itself is then conducted as described above. Utilising a TCD, a graph of thermal conductivity against temperature may be produced, with the conductivity approaching a baseline value at complete reduction. Comparison of the area under the TCD graph (relative to the baseline) obtained in the sample TPR data against the corresponding area of the standard TPR data allows the calculation of the relative amount of hydrogen consumed during pre-reduction between the sample and standard data. In practice, this involves subtracting the integrated area under the TCD graph obtained for the sample data from the area under the TCD graph for the standard data, then expressing the resultant value as a percentage of the integrated area from the standard data. Expressed as an equation, this is:

Method of calculating relative hydrogen consumption using TPR data $$\%\ H2\ \text{consumed} = 100 \times \frac{[\text{Area of standard } TPR \text{ data}] - [\text{Area of sample } TPR \text{ data}]}{[\text{Area of standard } TPR \text{ data}]} \qquad \text{Equation 1}$$

TPR is an advantageous technique to utilise for determining degree of reduction because the technical measurements on a sample are made following the reduction step. Accordingly, while the % $H_2$ consumed is calculated via the formula above, the data obtained is applicable even if another reducing gas (for example, carbon monoxide) has been used, merely being expressed as the equivalent % $H_2$ consumed and enabling the stoichiometry from hydrogen reduction to be used in calculating the degree of reduction i.e. the percentage of cobalt atoms present as $Co^0$. This is a preferred approach because determining simply the percentage $H_2$ consumed may correspond to a different relative amount of $Co^0$ produced by reduction for different catalysts, but $Co^0$ is understood to be the catalytically active species so in the context of the present invention it is desirable to understand the actual amount of $Co^0$ produced by reduction.

The complete reduction of cobalt oxide ($Co_3O_4$) is a two-step process (firstly the reduction to cobalt(II) oxide, also known as cobaltous oxide, and then the reduction of cobalt(II) oxide to metallic cobalt) as shown by the chemical equations below:

$$Co_3O_4+H_2 \rightarrow 3CoO+H_2O$$

$$CoO+H_2 \rightarrow Co^0+H_2O$$

Equations 2 and 3: Step-wise reduction of cobalt(II,III) oxide to metallic cobalt The overall reduction may alternatively be represented as a single stoichiometric equation:

$$Co_3O_4+4H_2 \rightarrow 3CoO+H_2O+3H_2 \rightarrow 3Co^0+4H_2O$$

Equation 4: Overall reduction of cobalt(II,III) oxide to metallic cobalt

Accordingly, in the first step, 1 equivalent of $H_2$ is consumed without producing any metallic cobalt, while in the second, 3 equivalents are consumed. In total, therefore, complete reduction requires 4 equivalents of $H_2$ to reduce the 3 equivalents Co to $Co^0$. However, the first step is believed to be much faster than the second so herein is assumed to proceed to completion before any formation of $Co^0$ occurs. The amount of hydrogen required to produce the metallic cobalt is thus higher per mole of metallic cobalt when the degree of reduction is lower, and tends towards the stoichiometric ratio of 4 moles of $H_2$ for every 3 moles of Co as 100% reduction is approached.

Taking this into account, the degree of reduction achieved in the sample may be calculated using the formula below:

Calculation of degree of reduction from *TPR* data $$\% \text{ Degree of Reduction} = 100 * \left(1 - \frac{4[\text{Area of sample } TPR \text{ data}]}{3[\text{Area of standard } TPR \text{ data}]}\right). \quad \text{Equation 5}$$

More generally, for a reduction having stoichiometry whereby x equivalents of $H_2$ are required before the rate determining step of the reduction, and y equivalents of $H_2$ are required during and after the rate determining step, the degree of reduction may be calculated using the formula below:

General Calculation of degree of reduction from *TPR* data $$\% \text{ Degree of Reduction} = 100 * \left(1 - \frac{(x+y)[\text{Area of sample } TPR \text{ data}]}{y[\text{Area of standard } TPR \text{ data}]}\right) \quad \text{Equation 6}$$

Using TPR as described above, the degree of reduction may thus be determined for a catalyst that has been reduced ex situ, e.g. following any period in storage, transport or other intermediate steps that may occur before the catalyst is used to produce hydrocarbons, in order to be assured that the amount of cobalt metal present by weight of cobalt remains within the range of the present invention. If not, additional measures may be taken in order to achieve the required degree of reduction, for example additional reduction in situ or avoiding exposing the catalyst to an oxidising atmosphere during storage and transport. Such avoidance of oxidising atmospheres may be achieved by packing the catalyst in an inert (e.g. nitrogen) atmosphere, packing the catalyst in a reducing atmosphere (e.g. 5% $H_2$, 95% nitrogen by volume), passivating by creating a thin, protective oxide layer on the surface of the catalyst, or wax-coating the catalyst for storage and transport.

The catalyst used in accordance with the present invention may comprise a cobalt compound intended to be reduced to metallic cobalt. The identity of the cobalt compound is not particularly limited except that the cobalt compound should be decomposable (either directly or indirectly (e.g. via intermediates) to metallic cobalt, including mixtures of such compounds. Preferably, the cobalt compound is oxidic cobalt, a cobalt compound decomposable thereto or mixtures thereof, for example cobalt(III) oxide, cobalt(II,III) oxide, and/or cobalt(II) oxide, compounds decomposable to cobalt(III) oxide, cobalt(II,III) oxide, and/or cobalt(II) oxide, and mixtures thereof. More preferably, the cobalt compound is cobalt(II,III) oxide, cobalt(II) oxide, a cobalt compound that is decomposable to cobalt(II,III) oxide and/or cobalt(II) oxide, or mixtures thereof, for example cobalt (II,III) oxide, cobalt(II) oxide, cobalt nitrate (e.g. cobalt nitrate hexahydrate), cobalt acetate or cobalt hydroxide. Even more preferably, the cobalt compound is cobalt(II,III) oxide, cobalt(II) oxide or mixtures thereof, as this removes the need for additional calcination/oxidation/decomposition steps to prepare the oxide, and even more preferably still the cobalt compound is cobalt(II,III) oxide. If a cobalt compound other than oxidic cobalt is used, this may be referred to herein as a catalyst precursor, from which the calcination/oxidation/decomposition step used to form cobalt oxide may be carried out in situ or ex situ with respect to the hydrocarbon synthesis reactor or with respect to the reduction step.

The amount of cobalt compound present in the catalyst is not particularly limited. According to some embodiments of the present invention, the catalyst comprises from 5% to 30%, preferably from 5% to 25% and more preferably from 10% to 20%, cobalt compound by weight of the catalyst.

The catalyst also comprises titanium dioxide (also referred to herein as titania) as a supporting material for the cobalt compound. The catalyst may further comprise one or more promoters in order to improve the activity of the catalyst. Non-limiting examples of promoters include: chromium, nickel, iron, molybdenum, tungsten, manganese, boron, zirconium, gallium, thorium, lanthanum, cerium, ruthenium, rhodium, rhenium, palladium, platinum and/or mixtures thereof. The one or more promoters may be present as the elemental metal or as a compound, for example an oxide. In some embodiments, the promoter comprises, or is selected from platinum, molybdenum or mixtures thereof, for example molybdenum. Such promoters may be present in an amount up to 15% by weight of the catalyst but may be advantageously present in an amount of from 0% to 5% by weight of the catalyst, from 0.1% to 3% by weight of the catalyst, or from 0.5% to 2.5% by weight of the catalyst, such as from 1% to 2.5% or from 1.5% to 2.25%, for example 2%.

The catalyst may be prepared by any known method, including impregnation, precipitation or gelation. A suitable method, for example, comprises impregnating titanium dioxide with a compound of cobalt that is thermally decomposable to metallic cobalt (e.g. via the oxide), such as cobalt nitrate, cobalt acetate or cobalt hydroxide. Any suitable impregnation technique including the incipient wetness technique or the excess solution technique, both of which are well-known in the art, may be employed. The incipient wetness technique is so-called because it requires that the volume of impregnating solution be predetermined so as to provide the minimum volume of solution necessary to just wet the entire surface of the support, with no excess liquid. The excess solution technique as the name implies, requires an excess of the impregnating solution, the solvent being thereafter removed, usually by evaporation. The impregnation solution may suitably be either an aqueous solution or a nonaqueous, organic solution of the cobalt compound. Suitable nonaqueous organic solvents include, for example, alcohols, ketones, liquid paraffinic hydrocarbons and ethers. Alternatively, aqueous organic solutions, for example an aqueous alcoholic solution, of the thermally decomposable cobalt compound may be employed.

Following preparation, the catalyst may also be formed by any known technique including extrusion, pulverisation, powderisation, pelletisation, granulation and/or coagulation. Preferably, the catalyst is extruded, for example to enable less pressure drop in a reactor and highly consistent diameter of the catalyst. In extrusion, an extrudable paste may be formed, such as from a mixture of the catalyst components in water, which is then extruded into the desired shape and dried to form the catalyst. Alternatively, an extrudable paste of titanium dioxide may be formed from a mixture of powdered titanium dioxide and water. This paste may then be extruded and typically dried and/or calcined to form the desired shape, which may then be contacted with a solution of a cobalt compound in order to impregnate the extruded support material with the cobalt compound. The resultant impregnated support material may then be dried to form the catalyst, which if not already comprising oxidic cobalt such as cobalt(III) oxide, cobalt(II,III) oxide or cobalt(II) oxide may also be calcined.

As indicated above, the present invention provides, in a first aspect, a process for the conversion of a feed comprising a mixture of hydrogen and carbon monoxide, preferably in the form of a synthesis gas mixture, to hydrocarbons, which process comprises contacting the feed with a reductively activated catalyst composition as hereinbefore described.

In the hydrocarbon synthesis processes described herein, the volume ratio of hydrogen to carbon monoxide ($H_2$:CO) in the feed is in the range of from 1:9 to 9:1 preferably in the range of from 0.5:1 to 5:1, more preferably from 1:1 to 3:1, and most preferably from 1.6:1 to 2.2:1. Such ratios especially apply as regards the feed to the reactor, e.g. at the reactor inlet. The feed may also comprise other gaseous components, such as nitrogen, carbon dioxide, water, methane and other saturated and/or unsaturated light hydrocarbons, each preferably being present at a concentration of less than 30% by volume. The temperature of the reaction (or reactor) is elevated, preferably in the range from 100 to 400° C., more preferably from 150 to 350° C., and most preferably from 150 to 250° C. The pressure of the reaction (or reactor) is atmospheric or elevated, preferably in the range from 1 to 100 bar (from 0.1 to 10 MPa), more preferably from 5 to 75 bar (from 0.5 to 7.5 MPa), and most preferably from 10 to 50 bar (from 1.0 to 5.0 MPa). As used herein "elevated" in relation to conditions refers to conditions greater than standard conditions, for example, temperatures and pressures greater than standard temperature and pressure (STP).

The gaseous reactants (feed) for the present process may be fed into the reactor either separately or pre-mixed (e.g. as in the case of syngas). They may initially all contact the solid catalyst at the same portion of the solid catalyst, or they may be added at different positions of the solid catalyst. The ratio of hydrogen gas to carbon monoxide gas may thus be determined from the relative flow rates when both streams are flowing. Preferably, the one or more gaseous reactants flow co-currently over the solid catalyst.

The feed used for the present process may also comprise recycled materials extracted from elsewhere in the process, such as unreacted reactants separated from any reduction steps associated with the process of the invention.

The mixture of hydrogen and carbon monoxide is suitably passed over the catalyst bed at a gas hourly space velocity (GHSV) in the range from 100 to 10000 $h^{-1}$ (gas volumes converted to standard temperature and pressure), preferably from 250 to 5000 $h^{-1}$, such as from 250 to 3000 $h^{-1}$, and more preferably from 250 to 2000 $h^{-1}$.

As is well known in the art, synthesis gas, which is preferably used as the feed for the present process, principally comprises carbon monoxide and hydrogen and possibly also minor amounts of carbon dioxide, nitrogen and other inert gases depending upon its origin and degree of purity. Methods of preparing synthesis gas are established in the art and usually involve the partial oxidation of a carbonaceous substance, e.g. coal. Alternatively, synthesis gas may be prepared, for example by the catalytic steam reforming of methane. The ratio of carbon monoxide to hydrogen present in the synthesis gas may be altered appropriately by the addition of either carbon monoxide or hydrogen, or may be adjusted by the so-called shift reaction well known to those skilled in the art.

The process of the invention may be carried out batch wise or continuously in a fixed bed, fluidised bed or slurry phase reactor. When using the catalyst as described in the present invention in a fixed bed process, the particle size should be of such shape and dimension that an acceptable pressure drop over the catalyst bed is achieved. A person skilled in the art is able to determine the particle dimension optimal for use in such fixed bed reactors. Particles of the desired shape and dimension may be obtained by extrusion of a paste to which optionally extrusion aids and/or binders may be optionally added.

According to second and third aspects, the present invention relates to uses of a catalyst comprising titanium dioxide support and cobalt, wherein the catalyst comprises from 30% to 95% metallic cobalt by weight of cobalt, for the conversion of a feed comprising a mixture of hydrogen gas and carbon monoxide gas to hydrocarbons, and to increase the selectivity and/or productivity of a process for the conversion of a feed comprising a mixture of hydrogen gas and carbon monoxide gas to hydrocarbons. As the catalyst so used is in a process for the conversion of a feed comprising a mixture of hydrogen gas and carbon monoxide gas to hydrocarbons (to which the first aspect of the invention relates), any features of the catalyst or any process relating to it described above in relation to the first aspect are applicable to these second and third aspects, either individually or in any combination.

In a fourth aspect, the present invention relates to a Fischer-Tropsch catalyst comprising titanium dioxide support and cobalt, wherein the catalyst comprises from 30% to 95% metallic cobalt by weight of cobalt. As the catalyst is intended for use in a process for the conversion of a feed comprising a mixture of hydrogen gas and carbon monoxide gas to hydrocarbons (to which the first aspect of the invention relates), any features of the catalyst or any process relating to it described above in relation to the first aspect are applicable to this fourth aspect, either individually or in any combination.

In a fifth aspect, the present invention relates to a process for making a Fischer-Tropsch catalyst according to the fourth aspect, comprising the step of reducing a catalyst comprising titanium dioxide support and oxidic cobalt or a cobalt compound decomposable thereto to produce the Fischer-Tropsch catalyst. As the catalyst is intended for use in a process for the conversion of a feed comprising a mixture of hydrogen gas and carbon monoxide gas to hydrocarbons (to which the first aspect of the invention relates), any features of the catalyst or any process relating to it described above in relation to the first aspect are applicable to this fifth aspect, either individually or in any combination.

In a sixth aspect, the present invention also provides a product (preferably a fuel) comprising hydrocarbons obtained from a process according to the first aspect. As the product results from a process for the conversion of a feed comprising a mixture of hydrogen gas and carbon monoxide gas to hydrocarbons (to which the first aspect of the invention relates), any features of the process described above in relation to the first aspect are applicable to this sixth aspect, either individually or in any combination.

EXAMPLES

Examples 1-6

Cobalt oxide supported on titanium dioxide was manufactured as a catalyst by impregnating titanium dioxide powder with an aqueous solution of cobalt nitrate hexahydrate, followed by extrusion of the formed paste, and then drying and calcining to yield catalyst extrudates with a cobalt loading of 10% by weight of catalyst and a manganese loading of 1% by weight of catalyst. 0.25 g of the catalyst was loaded into the quartz u-tube reactor of a TPR unit and subjected to reduction under 100% hydrogen gas (at a GHSV of 3800 $h^{-1}$) for 15 hours at the temperatures in Table 1 below. As described hereinabove, the degree of reduction was determined using TPR via comparison of the integrated areas of the TCD graphs of the samples against a standard that had been subject to TPR with no reduction step, in order to obtain the percentage hydrogen consumption, and calculation of the degree of reduction as percentage of Co present as $Co^0$ using Equation 5 detailed hereinabove.

TABLE 1

Temperature Programmed Reduction (TPR) of cobalt oxide/manganese on titanium dioxide support

| Example | Reduction Temperature (° C.) | Degree of Reduction (% of Co as $Co^0$) |
|---|---|---|
| 1 | No Pre-treatment | 0 |
| 2 | 200 | 28 |
| 3 | 220 | 51 |
| 4 | 240 | 74 |
| 5 | 260 | 99 |
| 6 (comparative) | 300 | 97 |

Examples 7-10

The catalyst sample was cobalt oxide on titanium dioxide support, 10 wt. % cobalt loading, 1 wt. % manganese loading. 9.6 g of catalyst sample was loaded into a metal liner of a multi-channel catalyst-screening microreactor. Each channel of the microreactor underwent the same drying procedure in parallel, before the catalysts were activated according to the following protocols under 100% $H_2$ gas at a GHSV of 3800 $h^{-1}$ and pressure of 1 atm:

Example 7 (comparative): From room temperature ramped to 150° C. at a rate of 2° C./min, then ramped to 200° C. at a rate of 1° C./min, before dwelling at 200° C. for 15 hours.

Example 8 (inventive): From room temperature ramped to 150° C. at a rate of 2° C./min, then ramped to 240° C. at a rate of 1° C./min, before dwelling at 240° C. for 15 hours.

Example 9 (comparative): From room temperature ramped to 150° C. at a rate of 2° C./min, then ramped to 260° C. at a rate of 1° C./min, before dwelling at 260° C. for 15 hours.

Example 10 (comparative): From room temperature ramped to 150° C. at a rate of 2° C./min, then ramped to 300° C. at a rate of 1° C./min, before dwelling at 300° C. for 15 hours.

The liners were then cooled, purged with nitrogen, and temperature ramped identically under a 1.8:1 $H_2$:CO molar stream of syngas in 18% $N_2$ at 30 barg total pressure at a GHSV of 1250 $h^{-1}$. Each example was operated at a temperature of 201-214° C. in order to achieve the same level of conversion, under identical operating conditions with results presented in Table 2. The data for the inventive example shows acceptable selectivity to $C_{5+}$ and $CH_4$ alongside a similar temperature to reach the same CO conversion rate versus comparative examples 9 and 10, despite the milder reduction conditions leading to a lower degree of reduction. Example 8 also shows improved selectivity to $C_{5+}$ and $CH_4$ alongside a lower temperature to reach the same CO conversion rate versus example 7.

TABLE 2

Performance data of examples 7-10 in conversion of syngas to hydrocarbons

| | Example | | | |
|---|---|---|---|---|
| | 7 | 8 | 9 | 10 |
| Pre-reduction Temperature (° C.) | 200 | 240 | 260 | 300 |
| GHSV ($h^{-1}$) | 1250 | 1250 | 1250 | 1250 |
| Temperature (° C.) | 214 | 201 | 200 | 198 |
| CO Conversion (%) | 67 | 65 | 65 | 65 |
| $C_{5+}$ Selectivity (%) | 74.8 | 81.8 | 85.0 | 86.8 |
| $CH_4$ Selectivity (%) | 15.0 | 10.8 | 8.9 | 7.4 |

Examples 11-13

The catalyst sample was cobalt oxide on titanium dioxide support, 10 wt. % cobalt loading, 2 wt. % manganese loading. Each catalyst sample (mass provided in Table 3) was loaded into a metal liner of a multi-channel catalyst-screening microreactor. Each channel of the microreactor underwent the same drying procedure in parallel, before the catalysts were activated according to the following protocols under 100% $H_2$ gas at a GHSV 3800 $h^{-1}$ and pressure of 1 atm:

From room temperature, ramped to 150° C. at a rate of 2° C./min, then ramped to 240° C. (example 11), 260° C. (example 12) or 300° C. (example 13) at a rate of 1° C./min, before dwelling at this final temperature for 15 hours.

The liners were then cooled, purged with nitrogen, and temperature ramped identically under a 1.8:1 $H_2$:CO molar stream of syngas in 18% $N_2$ at 30 barg total pressure and a GHSV of 1250 $h^{-1}$. Each example was operated at a temperature of 195° C. under identical operating conditions with results presented in Table 3. The data for example 11 clearly shows improved selectivity to $C_{5+}$ and similar selectivity to $CH_4$ alongside similar temperatures to reach the same CO conversion rate versus the example 13, despite the milder reduction conditions leading to a lower degree of reduction, and even despite a lower mass of catalyst having been used, indicating improved activity.

TABLE 3

Performance data of examples 11-13 in conversion of syngas to hydrocarbons

| | Example | | |
|---|---|---|---|
| | 11 | 12 | 13 |
| Mass of Catalyst (g) | 8.6 | 8.8 | 9.4 |
| Pre-reduction Temperature (° C.) | 240 | 260 | 300 |
| GHSV ($h^{-1}$) | 1250 | 1250 | 1250 |
| Temperature (° C.) | 204 | 206 | 203 |
| CO Conversion (%) | 64 | 64 | 63 |
| $C_{5+}$ Selectivity (%) | 83.7 | 81.0 | 82.5 |
| $CH_4$ Selectivity (%) | 9.3 | 10.1 | 9.2 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:

1. A process for the conversion of a feed comprising a mixture of hydrogen and carbon monoxide to hydrocarbons, the hydrogen and carbon monoxide in the feed being present in a ratio of from 1:9 to 9:1 by volume, the process comprising:

pre-treating a composition comprising:

a titanium dioxide support, and oxidic cobalt or a cobalt compound decomposable thereto, with a reducing agent at a temperature of from 200° C. to 250° C. to form a catalyst comprising titanium dioxide and cobalt; and contacting the feed at elevated temperature and atmospheric or elevated pressure with the catalyst to form hydrocarbons;

wherein the catalyst initially comprises from 30% to 90% metallic cobalt by weight of cobalt during the contacting of the feed with the catalyst.

2. A process according to claim 1, wherein the catalyst initially comprises from 35% to 90% metallic cobalt by weight of cobalt.

3. A process according to claim 1, wherein the pretreatment is conducted by exposing the catalyst composition to a hydrogen gas-containing stream, wherein the hydrogen gas-containing stream comprises less than 10% carbon monoxide gas by volume of carbon monoxide gas and hydrogen gas.

4. A process according to claim 1, wherein the pretreatment is conducted by exposing the catalyst composition to a carbon monoxide gas-containing stream, wherein the carbon monoxide gas-containing stream comprises less than 10% hydrogen gas by volume of carbon monoxide gas and hydrogen gas.

5. A process according to claim 1, wherein the mixture of hydrogen and carbon monoxide is in the form of synthesis gas, preferably wherein the synthesis gas comprises hydrogen gas and carbon monoxide gas at a ratio in the range of from 0.5:1 to 5:1 by volume.

6. A process according to claim 1, wherein the catalyst comprises from 5% to 30% cobalt by weight of the catalyst.

7. A process according to claim 1, wherein the catalyst further comprises one or more promoters selected from chromium, nickel, iron, molybdenum, tungsten, manganese, boron, zirconium, gallium, thorium, lanthanum, cerium, ruthenium, rhenium, palladium, platinum, compounds and/or mixtures thereof.

8. A process according to claim 7, wherein the promoter is present in an amount up to 5% by weight of the catalyst.

9. A process according to claim 1, wherein the oxidic cobalt or a cobalt compound decomposable thereto is selected from cobalt (III) oxide, cobalt (II,III) oxide, cobalt (II) oxide, compounds decomposable thereto, or mixtures thereof.

10. A process according to claim 1, wherein the catalyst initially comprises from 40% to 85% metallic cobalt by weight of cobalt.

11. A process according to claim 1, wherein the catalyst initially comprises from 50% to 85% metallic cobalt by weight of cobalt.

12. A process according to claim 1, wherein the catalyst initially comprises from 70% to 80% metallic cobalt by weight of cobalt.

13. A process according to claim 1, wherein the step of pre-treating the catalyst composition occurs at a temperature of from 220° C. to 250° C.

14. A process according to claim 13, wherein the catalyst initially comprises from 40% to 85% metallic cobalt by weight of cobalt.

* * * * *